United States Patent [19]
Bacardit

[11] 4,300,594
[45] Nov. 17, 1981

[54] HYDRAULIC ROTARY DISTRIBUTOR, PARTICULARLY FOR POWER STEERING MECHANISMS

[75] Inventor: Juan S. Bacardit, Barcelona, Spain

[73] Assignee: Bendiberica S.A., Barcelona, Spain

[21] Appl. No.: 55,931

[22] Filed: Jul. 9, 1979

[30] Foreign Application Priority Data

Jul. 27, 1978 [ES] Spain .................................. 472.087

[51] Int. Cl.³ .............................................. F15B 9/10
[52] U.S. Cl. .............................. 137/625.21; 91/375 R
[58] Field of Search ...................... 137/625.21, 625.23; 91/375 R, 375 A

[56] References Cited
U.S. PATENT DOCUMENTS 3,998,131  12/1976  Adams ............................ 91/375 A X

FOREIGN PATENT DOCUMENTS 1014444 of 0000 Fed. Rep. of Germany .
1101186 of 0000 Fed. Rep. of Germany .
2404580 of 0000 Fed. Rep. of Germany .
2434604 of 0000 Fed. Rep. of Germany .

*Primary Examiner*—Alan Cohan
*Attorney, Agent, or Firm*—Paul David Schoenle; Ken C. Decker; Terry L. Miller

[57] ABSTRACT

A hydraulic rotary distributor comprising two rotary members connected respectively to an input shaft and to an output shaft for controlling the supply in pressurized fluid to a power-assistance motor as a function of their relative angular position. According to this invention, are provided locking means dependent of a control pressure for preventing said rotary members from relative rotation until the torque applied to the input shaft exceeds a predetermined value. The invention is particularly intended for use in power steering mechanisms for automotive vehicles.

4 Claims, 4 Drawing Figures

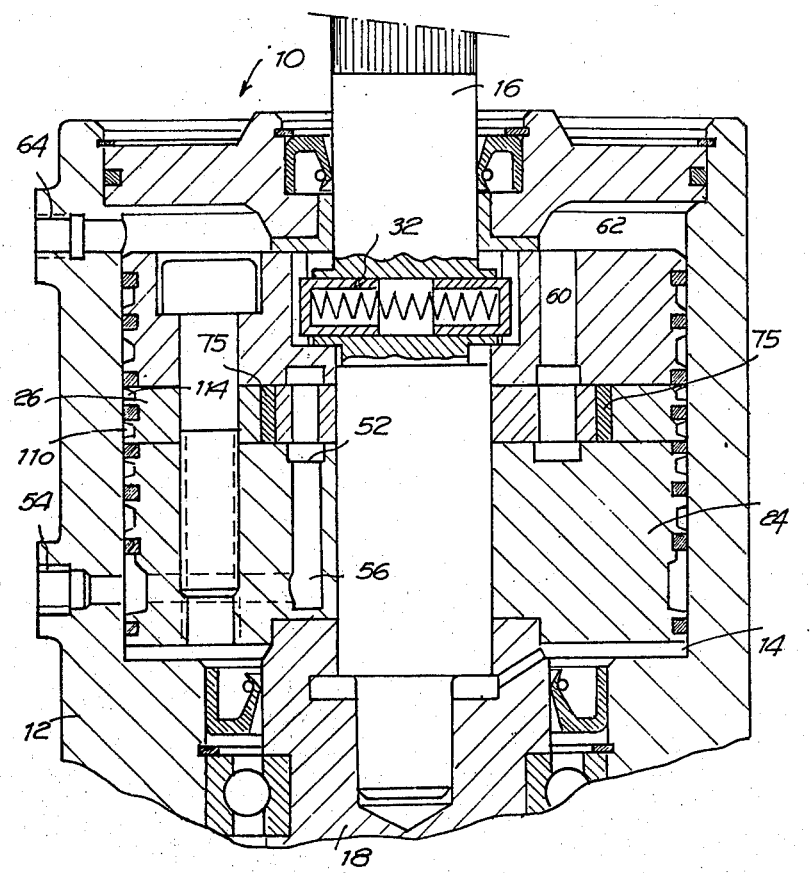

HYDRAULIC ROTARY DISTRIBUTOR, PARTICULARLY FOR POWER STEERING MECHANISMS

The present invention concerns a hydraulic rotary distributor intended to feed a double-action motor of a power-assistance mechanism, particularly for power-assisted steering gear.

Power-assisted steering gears comprise a rotary distributor or valve with an input shaft and an output shaft. As a function of the relative angular position of the input shaft and the output shaft, the valve controls the feeding of fluid under pressure to the compartments of a double-action motor, from a high pressure source and a low pressure reservoir. The operation of the valve is essentially characterized by the shape of a curve called "characteristic of the valve" which represents the working pressure of the double-action motor as a function of the torque applied to the input shaft of the valve. In power-assisted steering systems, the characteristic of the distribution valve preferably has a parabolic course. In practice, this curve comprises several adjacent linear parts with greater and greater slopes as the value of the input torque increases. In particular, the first part which substantially corresponds to driving in a straight line has a relatively small slope for values of the input torque between zero and a first predetermined value.

For a given valve, it seems desirable to be able to modify this predetermined value according to the requirements of the user or as a function of the driving conditions of the vehicle, so that the first part corresponds to a larger or smaller range of input torque, and the object of the present invention is to propose a hydraulic rotary distributor comprising means allowing modification, according to the requirements of the user, of the course of the part of the characteristic corresponding to driving in a straight line.

The invention proposes to this effect a hydraulic rotary distributor for power-assisted steering gear comprising a first rotary member solid in rotation with an input shaft, and a second rotary member solid in rotation with the output shaft, the said first and second rotary members forming between them fluid passages intended to control the flow of fluid between a pressure source and at least one compartment of a power-assistance motor as a function of the relative angular position of the said input and output members, this distributor being more particularly characterized in that it comprises locking means responsive to a control pressure so as to stop the relative rotation between the said first and second rotary members from a non-operating position in response to the application of a torque applied to the input member until the torque applied to said input member is greater than a predetermined value.

A rotary hydraulic distributor is known in accordance with the U.S. Pat. No. 3,998,132, issued Dec. 21, 1976, to F. J. Adams wherein a locking means comprises a pressure-responsive detent adapted to develop a torque resisting relative rotation of the first and second rotary members. The detent means comprises a roller member movably received in a radially-extending bore defined in one of the rotary members and urged by a variable fluid pressure into engagement with a V-shaped notch defined in the other rotary member. The roller member is slidably constrained by the radially-extending bore in the one rotary member and is movable only in the radial direction.

With a locking detent of the type illustrated in the Adams patent, resisting torque developed by the detent results only from the action of the roller member against the inclined walls of the V-shaped notch. Consequently, the resisting torque developed by the detent may be relatively small in comparison to the fluid pressure acting on the roller member. Additionally, the resisting torque may be nonuniform responsive to relative rotation of the rotary members because of the roller member moving out of alignment with the V-shaped notch.

The invention as claimed is intended to avoid one or more of the drawbacks of prior rotary hydraulic distributors by providing a distributor having a pressure responsive detent wherein the roller member is disposed between circumferentially-extending slopes which confront one another and which are substantially parallel so as to avoid a nonuniform torque response of the detent.

The invention will be better understood and other advantages will appear from reading the description which follows and which refers to the attached drawings, given solely by way of example and illustrating two embodiments of the invention, in which:

FIG. 3 is a view in section (at the line A—A of FIG. 4) of a second embodiment of the hydraulic distributor according to the present invention in which locking is obtained with the aid of essentially hydraulic means;

Figure 1:
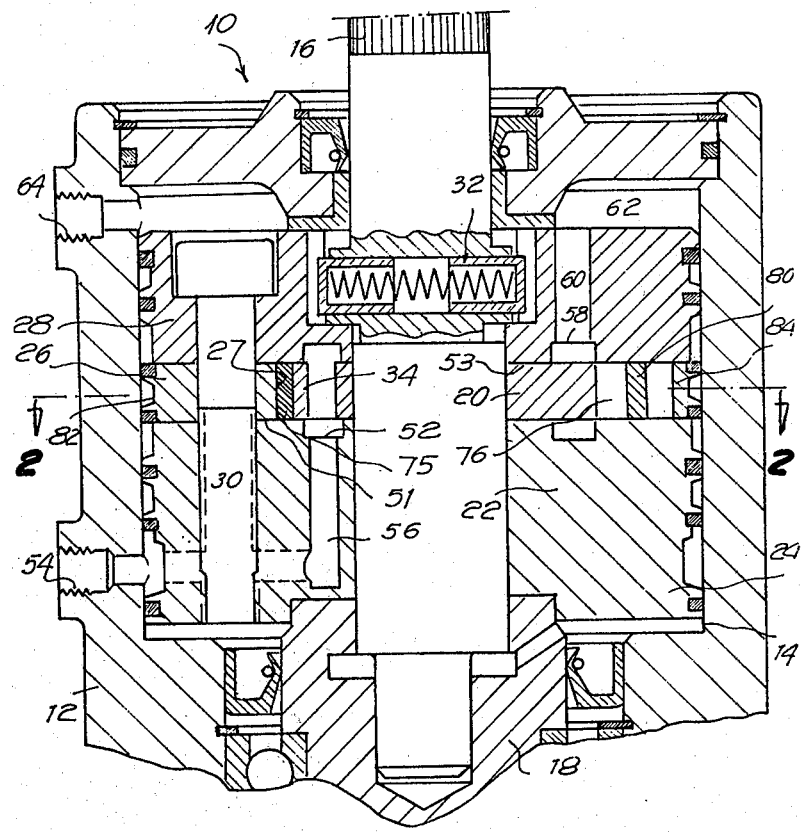
FIG. 1 is a view in section (at the line A—A of FIG. 2) of a first embodiment of the hydraulic distributor according to the present invention in which locking is obtained with the aid of mechanical means.
Figure 2:
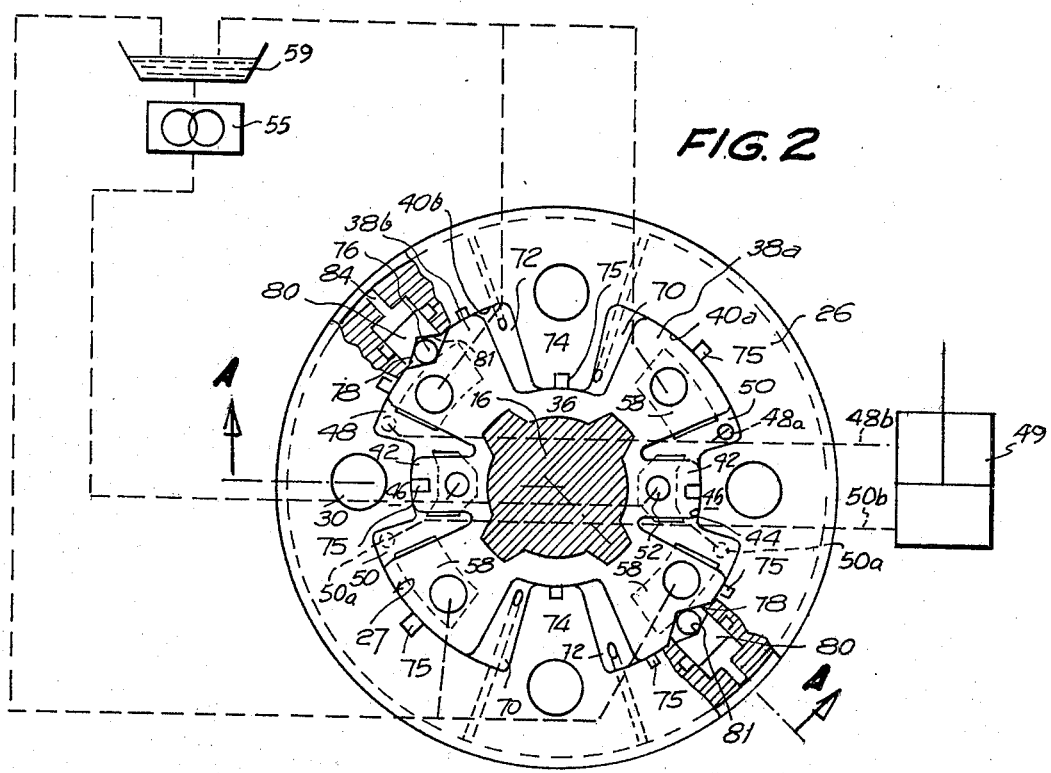
FIG. 2 is a view in section at the line 2—2 of FIG. 1.

With reference now to FIGS. 1 and 2, the numerical reference 10 designates in a general way a rotary hydraulic distributor for a power-assisted steering gear which comprises a housing 12 inside which is defined a bore 14 in which are disposed coaxially an input shaft 16 and an output shaft 18. The input shaft 16 is intended to be connected to a control member for steering the vehicle, and the output shaft 18 is intended to be connected to the steering gear. In the bore 14 are disposed a first rotary element 20 solid in rotation with the input shaft 16 and a second rotary element 22 solid in rotation with the output shaft 18. The second rotary element 22 is constituted by three annular parts 24, 26, 28 disposed in that order, coaxially to the input shaft 16 and rendered mutually solid by axial connecting means 30 such as screws or similar elements. The annular parts 24, 26 and 28 slide in rotation in the bore 14 and are mounted on the shaft 16 so as to define a coupling allowing a limited rotary movement between the said shaft 16 and the said annular parts. In addition, a resilient connection is provided between the input shaft 16 and the second rotary element 22 by an intermediate spring 32 intended to afford a mechanical centering. The annular part 26 interposed between the parts 24 and 28 has a crown-shaped part so as to define a central aperture limited by a cylindrical wall 27. Thus the parts 24 and 28 and the intermediate part 26 cooperate so as to define a substantially disk-shaped cavity 34 traversed along its axis of symmetry by the input shaft 16.

The rotary member 20 is mounted for rotation in the cavity 34. It comprises a central hub 36 from which project radially outwards a plurality of arms which cooperate with the walls of the said cavity so as to sealingly divide the latter into a certain number of chambers which will be described in more detail later in the description. From the central hub 36 project a first pair of diametrically opposite arms 38a and a second pair of arms 38b also diametrically opposite, and perpendicular to the arms 38a. The arms 38a and 38b have cylindrical end surfaces with a large radius of curvature which cooperate slidingly respectively with the facing cylindrical surface parts 40a and 40b of the cylindrical wall 27 limiting the central aperture of the intermediate part 26. The arms 38a and 38b and the hub 36 cooperate with the walls of the cavity 34 so as to divide the latter into four sector-shaped spaces. In two of these diametrically opposite spaces, arms 42 (shorter in length than the arms 38a, 38b) project radially from the hub 36 and each comprises an end surface 44 cylindrical in shape facing a corresponding tooth 46 projecting radially inwards from the annular part 26. Each arm 42 thus divides the sector-shaped space into which it enters into a first chamber 48 edged by the arms 38b and 42, and a second chamber 50 edged by the arms 38a and 42. The chambers 48 and 50 constitute working chambers connected to the respective compartments of a double-action hydraulic motor 49 via ports 48a and 50a and conduits represented schematically at 48b and 50b.

The face 51 of the part 24 which limits the cavity 34 comprises apertures 52 which are practically entirely covered by the arms 42 when the latter are in their non-operating position, as illustrated in FIG. 2. Each aperture 52 is in communication with a high pressure fluid source 55 (illustrated schematically in FIG. 2) via an inlet orifice 54 defined in the housing 12, and via passages 56 in the annular part 24. Nevertheless, when the rotary member 20 is in its non-operating position, the arms 42 are in an angular position in which a small flow of fluid is allowed between each aperture 52 and the pressure chambers 48 and 50 adjacent to it. Similarly, the face 53 of the annular part 28 which limits the cavity 34 comprises four apertures 58 which are practically entirely covered over by the arms 38a and 38b. Nevertheless, when the star-shaped rotary member 20 is in its non-operating position, the arms 38a are in an angular position allowing a small flow of fluid between the pressure chambers 50 and the apertures covered by the said arms 38a. Similarly, a small communication of fluid is normally allowed between the pressure chambers 48 and the apertures 58 covered by the arms 38b. The four apertures 58 are in communication with a low pressure reservoir 59 (illustrated schematically in FIG. 2) via passages 60 in the annular part 28, a chamber 62 and an outlet orifice 64 defined in the housing 12.

Each of the two other sector-shaped spaces, defined between the arms 38a and 38b and the walls of the cavity 34, is divided into two auxiliary chambers 70, 72 by a radial tooth 74 projecting inwards from the part 26 so as to come into sealed contact with the outer surface of the hub 36. Each auxiliary chamber 70 is in communication with a corresponding pressure chamber 48 via passages (not represented) and a first control valve (not represented) external to the housing 12. The first control valve stays in an open position as long as the pressure in the chamber 48 is less than a predetermined threshold value.

In an identical way, each auxiliary chamber 72 is in communication with a corresponding chamber 50 via a second control valve also external to the housing 12, and which functions in an identical way to the first valve.

It will also be noted that seals 75 are disposed suitably between the surface 27 and the cylindrical end surfaces of the arms so as to ensure a sealed separation between the chambers of the cavity and to facilitate the relative rotation between the rotary members 20 and 22.

The distributor is also equipped with locking means responsive to a control pressure so as to create a resisting torque and prevent the relative rotation between the first and second rotary members from their non-operating position, in response to the application of a torque to the input shaft, until the said torque applied to said input shaft is greater than a predetermined value. The locking means are constituted by rollers 76 disposed in notches 78 defined in the cylindrical surfaces constituted by the ends of the arms 38b and extending along one of the said cylindrical surfaces. The notches 78 comprise two slopes intersecting so as to define a dihedron, and the rollers 76 are pushed against the bottom of the notches 78 under the influence of a fluid pressure coming from an independent pressure source (not illustrated) transmitted via pistons 80 mounted to slide radially inside the intermediate annular part 26. The pistons 80 also include notches 81 which comprise two slopes intersecting so as to define a dihedron. The slopes of the notches 78 and 81 confront each other so that the rollers 76 engage opposing pairs of slopes which are substantially parallel. The control pressure is transmitted to the piston 80 via an annular groove 82 and a radial passage 84 provided in the annular part 26. This pressure can have a fixed value predetermined or variable as a function of the conditions of functioning of the vehicle.

It will also be noted that the rollers 76 could equally as well be replaced by balls without thereby going beyond the limits of the present invention.

The distributor represented in FIGS. 1 and 2 operates in the following way: when the rotary member 20 is driven in rotation in the clockwise direction or in the counter-clockwise direction, in response to the application of a torque to the input shaft, the rollers 76 urged radially against the dihedrons of the notches 78 and 81 under the influence of the control pressure which comes from the external source prevent the setting in rotation of the said rotary member until the torque applied reaches a predetermined threshold value, which is a function of the value of the control pressure. When the torque applied exceeds this threshold value, the rotary member 20 is set in rotation in the cavity 34. Rotation of the member 20 relative to member 26 causes the rollers 76 to roll between a pair of substantially parallel, confronting slopes of the notches 78 and 81. Therefore, the rollers 76 move circumferentially in the direction of rotation of member 20 and radially outwardly. Radially outward movement of the rollers 76 moves the pistons 80 outwardly. Fluid pressure acting on the pistons 80 creates a force directed radially inwardly which is transferred to the rollers 76 and to the member 20, creating a torque resisting relative rotation of the members 20 and 22. Because the force transferred from the pistons 80 to the member 22 is transferred by the rollers 76 which roll between substantially parallel slopes, there is no significant variation of the resisting torque as the member 20 rotates relative to the member 22. As long as the torque applied is less than the threshold value (function of the control pressure), practically no pressure is transmitted to the double-action motor.

If the rotary member 20 is set in rotation in the clockwise direction, the arms 38b uncover a wider extent of the corresponding orifices 58 while the arms 38a cover the other orifices 58 further. In addition, the arms 42 cooperate with the orifices 52 so as to lessen the section of the fluid passage between the latter and the chambers 48 and so as to increase the section of the fluid passage between the said orifices 52 and the chambers 50. Of course, the laws of variation of the sections of the said fluid passages can be modified suitably by the provision of chamfers in the radial edges of the apertures 52 and 58. Thus, when the rotary member 20 enters into rotation in the clockwise direction, a high pressure is established in the chambers 50 and 72 while a low pressure is established in the chambers 48 and 70. Due to the difference in radial surfaces of the arms 38a and 42, the rotary member is then subjected to a reaction torque resulting from the high pressure in the chambers 50 and 72. In a first stage, the increase in pressure is transmitted to the chambers 50 and 72 and the reaction torque increases at a first predetermined rate as a function of the high pressure. When the high pressure exceeds the predetermined threshold value previously mentioned, the second control valve closes the fluid communication between the chambers 50 and the chambers 72. The pressure in the latter ceases to increase, and the increase in the reaction torque only results in the increase of the pressure in the chambers 50, and is effected at a second predetermined rate. This modification in the rate of variation of the reaction torque from a given high pressure value corresponds to a change of slope between the second and third parts of the characteristic curve corresponding respectively to cornering and parking manoeuvres. The change of slope is effected for a value of the input torque which is a function of the cut-off pressure of the control valves.

If the rotary member 20 is set in rotation in the counter-clockwise direction, the distributor functions in an identical way, but high fluid pressure is transmitted to the chambers 48 and 70 while the low pressure is transmitted to the chambers 50 and 72.

Figure 4:
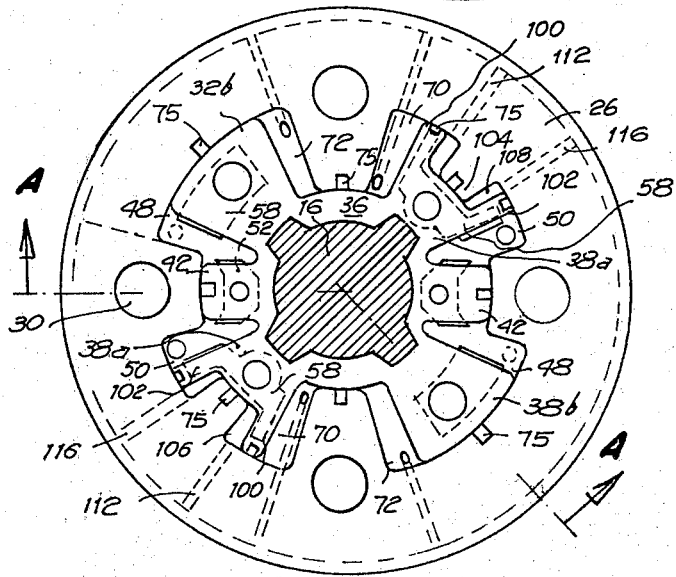
FIG. 4 is a view in section of the hydraulic distributor of FIG. 3.

With reference now to FIGS. 3 and 4, a rotary distributor substantially identical to that in FIGS. 1 and 2 has been represented, with the exception of the locking means which are here obtained hydraulically. The elements identical to those in FIGS. 1 and 2 have been allotted the same numerical references. Each arm 38a of the rotary member 20 ends in two radial fingers 100, 102 so as to constitute a fork. In the cavity 34, teeth 104 project radially from the annular part 26 between each pair of fingers 100, 102 so as to sealingly cooperate with the arm 38a and divide the space of the cavity 34 between the two fingers into a first and second reaction chambers 106 and 108. Each reaction chamber is normally subjected to a control pressure coming from an external source via a flow divider. More precisely, the chambers 106 receive the control pressure via an annular groove 110 and passages 112 in the annular part 26. Similarly, the chambers 108 receive the control pressure via another annular groove 114 and passages 116. The apertures 58 here have a shape adapted to the shape of the fingers 100 and 102 so that the latter cover the said apertures so as to prevent all fluid communication between the reaction chambers 106 and 108, and the low pressure orifice 64.

The pressures prevailing in the reaction chambers 108 and 106 respectively urge the rotary member 20 in the clockwise direction and in the counter-clockwise direction so as to create an equilibrium when the rotary member is in its non-operating position.

In response to the application of an input torque to the shaft 16, the rotary member is driven through a small rotation so that one of the chambers 106 and 108 is put into communication with the low pressure source via the orifice 58 which is then uncovered by one of the fingers 100 or 102. The difference in pressure thus created between the reaction chambers opposes a torque resisting the driving of the rotary member 20. When the input torque has reached a predetermined value, the reaction torque, which is a function of the control pressure, is no longer enough to stop the rotation of the rotary member and the distributor then operates in the same way as that described with reference to FIGS. 1 and 2.

Although, in the embodiment now described, the distributor constituted by the chambers 48 and 50 cooperating with the apertures 52 and 58 and the arms 38a and 38b is of the open-centre type, it will be understood that the invention could also be implemented in the case of a closed-centred hydraulic distributor. In this instance, when the rotary member is in its non-operating position, the arms 38a and 38b would entirely cover the low pressure orifices 58 and the arms 42 would entirely cover the high pressure orifices 52.

What I claim is:

1. A hydraulic rotary distributor for power-assisted steering gear comprising a first rotary member solid in rotation with an input shaft, and a second rotary member solid in rotation with an output shaft, the said first and second rotary members forming between them fluid passages intended to control the fluid flow between a pressure source and at least one compartment of a power-assistance motor as a function of the relative angular position of said first and second rotary members, said distributor further comprising locking means responsive to a control pressure so as to prevent the relative rotation between said first and second rotary members from a non-operating position in response to the application of a torque to the input shaft, until said torque applied to the input shaft is greater than a predetermined value, one of the rotary members comprising an external cylindrical surface sealingly cooperating with an internal cylindrical surface on the other rotary member, said locking means comprising at least one ball or roller member radially urged towards the bottom of a notch defined in the said external cylindrical surface under the influence of the control pressure acting on a pressure-responsive member movably carried by the other of said rotary members, said pressure-responsive member defining a notch confronting the notch on said one rotary member and said notches receiving said ball or roller member.

2. A hydraulic rotary distributor according to claim 1, wherein the rotary member in which is defined the said notch is the member solid with the input shaft.

3. A hydraulic rotary distributor according to claim 2, wherein each of the notches extends parallel to the axis of the external cylindrical surface, and comprises two slopes intersecting so as to define a dihedron.

4. A hydraulic rotary distributor according to claim 3 wherein each of the two slopes of each notch is substantially parallel to and confronts a slope of the other notch, said ball or roller member rolling between said substantially parallel confronting slopes responsive to relative rotation of said rotary members.

* * * * *